US007346523B1

(12) United States Patent
Provost et al.

(10) Patent No.: US 7,346,523 B1
(45) Date of Patent: *Mar. 18, 2008

(54) PROCESSING AN INSURANCE CLAIM USING ELECTRONIC VERSIONS OF SUPPORTING DOCUMENTS (75) Inventors: Wayne A. Provost, Las Vegas, NV (US); Ryan M. Trimble, Laguna Hills, CA (US)

(73) Assignee: P5, Inc., Salt Lake City, UT (US)

( * ) Notice: Subject to any disclaimer, the term of this patent is extended or adjusted under 35 U.S.C. 154(b) by 1245 days.

This patent is subject to a terminal disclaimer.

(21) Appl. No.: 10/044,357

(22) Filed: Jan. 11, 2002

(51) Int. Cl.
G06F 19/00 (2006.01)
G06F 10/00 (2006.01)
G06F 40/00 (2006.01)

(52) U.S. Cl. .............................. 705/4; 705/2
(58) Field of Classification Search ................ 705/2–3, 705/4
See application file for complete search history.

(56) References Cited

U.S. PATENT DOCUMENTS

| | | | | |
|---|---|---|---|---|
| 4,491,725 A | * | 1/1985 | Pritchard ........................ 705/2 |
| 4,831,526 A | | 5/1989 | Luchs et al. ................. 364/401 |
| 4,858,121 A | * | 8/1989 | Barber et al. ................... 705/2 |
| 4,876,648 A | | 10/1989 | Lloyd .......................... 364/408 |
| 4,890,228 A | | 12/1989 | Longfield ..................... 364/408 |
| 5,025,138 A | | 6/1991 | Cuervo ........................ 235/379 |
| 5,070,452 A | * | 12/1991 | Doyle et al. .................... 705/2 |
| 5,193,057 A | | 3/1993 | Longfield ..................... 364/408 |
| 5,225,976 A | | 7/1993 | Tawil .......................... 364/401 |
| 5,235,507 A | * | 8/1993 | Sackler et al. .................. 705/2 |
| 5,235,702 A | * | 8/1993 | Miller ......................... 707/102 |
| 5,253,164 A | | 10/1993 | Holloway et al. ........... 364/406 |
| 5,301,105 A | * | 4/1994 | Cummings, Jr. ................ 705/2 |
| 5,359,509 A | * | 10/1994 | Little et al. .................... 705/2 |
| 5,426,281 A | | 6/1995 | Abecassis .................... 235/379 |
| 5,519,607 A | | 5/1996 | Tawil .......................... 364/401 |

(Continued)

FOREIGN PATENT DOCUMENTS

JP 2001-076055 3/2001

(Continued)

OTHER PUBLICATIONS

Robinson-Crowley, Christine. "Understanding Patient Financial Services" Copyright 1998. Aspen Publishers.*

(Continued)

Primary Examiner—Joseph Thomas
Assistant Examiner—Mike Tomaszewski
(74) Attorney, Agent, or Firm—Workman Nydegger (57) ABSTRACT

Methods and systems for requesting and delivering supporting documents to an insurance carrier to enable the carrier to process an insurance claim for services rendered by a physician provider. Hard copies of supporting documents are converted to electronic images that are accessible by the carrier through the Internet, thereby eliminating the need for communication between the provider and the carrier through regular mail. The images are indexed based upon the insurance claim, the provider, the patient, and/or the carrier to enable the carrier to access the images associated with a specific insurance claim efficiently. In addition, the insurance claim can be pre-adjudicated prior to delivering the claim to the carrier for processing and can be approved and paid before the carrier processes the claim.

5 Claims, 4 Drawing Sheets

U.S. PATENT DOCUMENTS

| | | | |
|---|---|---|---|
| 5,523,942 A | 6/1996 | Tyler et al. | 364/401 |
| 5,644,778 A * | 7/1997 | Burks et al. | 705/2 |
| 5,704,044 A * | 12/1997 | Tarter et al. | 705/4 |
| 5,903,873 A | 5/1999 | Peterson et al. | 705/4 |
| 5,903,881 A | 5/1999 | Schrader et al. | 705/42 |
| 5,911,132 A | 6/1999 | Sloane | 705/3 |
| 5,915,241 A | 6/1999 | Giannini | 705/2 |
| 5,930,759 A * | 7/1999 | Moore et al. | 705/2 |
| 5,950,169 A * | 9/1999 | Borghesi et al. | 705/4 |
| 5,953,710 A | 9/1999 | Fleming | 705/38 |
| 5,963,921 A | 10/1999 | Longfield | 705/31 |
| 6,003,007 A | 12/1999 | DiRienzo | 705/4 |
| 6,012,035 A | 1/2000 | Freeman, Jr. et al. | 705/2 |
| 6,029,150 A | 2/2000 | Kravitz | 705/39 |
| 6,076,066 A | 6/2000 | DiRienzo et al. | |
| 6,112,183 A | 8/2000 | Swanson et al. | 705/2 |
| 6,202,052 B1 | 3/2001 | Miller | 705/31 |
| 6,208,973 B1 * | 3/2001 | Boyer et al. | 705/2 |
| 6,283,761 B1 * | 9/2001 | Joao | 434/236 |
| 6,304,860 B1 | 10/2001 | Martin, Jr. et al. | 705/4 |
| 6,341,265 B1 * | 1/2002 | Provost et al. | 705/4 |
| 6,343,271 B1 * | 1/2002 | Peterson et al. | 705/4 |
| 6,477,513 B1 | 11/2002 | Walker et al. | 705/76 |
| 6,738,784 B1 * | 5/2004 | Howes | 707/104.1 |
| 6,747,692 B2 | 6/2004 | Patel et al. | 348/211.2 |
| 6,820,058 B2 | 11/2004 | Wood et al. | 705/4 |
| 7,072,842 B2 * | 7/2006 | Provost et al. | 705/4 |
| 2001/0032099 A1 | 10/2001 | Joao | 705/2 |
| 2001/0047325 A1 * | 11/2001 | Livingston | 705/38 |
| 2001/0047329 A1 | 11/2001 | Ashby | 705/39 |
| 2002/0002475 A1 | 1/2002 | Freedman et al. | 705/4 |
| 2002/0004782 A1 | 1/2002 | Cincotta | 705/39 |
| 2002/0010685 A1 | 1/2002 | Ashby | 705/80 |
| 2002/0032583 A1 | 3/2002 | Joao | 705/2 |
| 2002/0049617 A1 * | 4/2002 | Lencki et al. | 705/4 |
| 2002/0077860 A1 | 6/2002 | Earnest et al. | 705/3 |
| 2002/0087461 A1 | 7/2002 | Ganesan et al. | 705/39 |
| 2002/0087465 A1 | 7/2002 | Ganesan et al. | 705/39 |
| 2002/0087469 A1 | 7/2002 | Ganesan et al. | 705/40 |
| 2002/0091549 A1 * | 7/2002 | Provost et al. | 705/4 |
| 2002/0123907 A1 | 9/2002 | Strayer | |
| 2002/0147678 A1 | 10/2002 | Drunsic | 705/39 |
| 2002/0169955 A1 | 11/2002 | Bryant, Jr. et al. | |
| 2003/0069760 A1 | 4/2003 | Gelber | 705/4 |
| 2003/0083906 A1 * | 5/2003 | Howell et al. | 705/4 |
| 2003/0187695 A1 | 10/2003 | Drennan | 705/2 |
| 2003/0208379 A1 | 11/2003 | Haskey et al. | |
| 2004/0002915 A1 | 1/2004 | McDonald et al. | 705/38 |
| 2004/0083185 A1 | 4/2004 | Currans et al. | 705/77 |
| 2004/0205664 A1 * | 10/2004 | Prendergast | 715/530 |
| 2004/0236613 A1 | 11/2004 | Lundberg | 705/4 |
| 2005/0033604 A1 | 2/2005 | Hogan | 705/2 |
| 2005/0033677 A1 | 2/2005 | Birdsong et al. | 705/35 |
| 2005/0216315 A1 | 9/2005 | Andersson | 705/4 |

FOREIGN PATENT DOCUMENTS

| | | |
|---|---|---|
| JP | 2003-022410 | 1/2003 |
| WO | WO 2001/09701 A | 2/2001 |
| WO | WO 2086688 A1 * | 10/2002 |

OTHER PUBLICATIONS

Mueller, Christopher. "Evidence: Practice Under the Rules" Copyright 1999. Aspen Publishers. 2nd Edition.*

Business Editors. "MedCom USA Inc. Names New CEO" Aug. 9, 2001. Business Wire. p. 1.*

PR Newswire. "AnciCare Builds State-of-the-Art Billing Efficiency With New eStellarNet Payer Connectivity Agreement" Apr. 27, 2001. p. 1.*

Business Editors. "VantageMed and eStellarNet Announce Strategic Relationship for Electronic Processing of Non-Group Health Transactions" Dec. 19, 2000. Business Wire. p. 1.*

Business Editors. MD-Online.com Appears On Alexander Haig's World business Review TV Series. Oct. 24, 2000. Business Wire. p. 1.*

PR Newswire. "Claimsnet.com Enters Into Co-branding Partnership With Synertech®" Sep. 18, 2000. p. 1.*

Business Editors. "DrFirst.com Launches Secure Message Exchange Network Health Care Providers; DrFirst.com solves major problem in health care industry—securely connecting its participants" Aug. 22, 2000. p. 1.*

PR Newswire. "Physiciansite.com Announces Stock & Cash Transaction Valued At Approximately $43 Million" Aug. 24, 1999. p. 1.* e-StellarNet @ http://web.archive.org/web/20010201203200/http://www/estellarnet.com/. Copyright 1997-2001.*

MD On-line.com @ http://web.archive.org/web/20010815084319/mdon-line.com/md_welcome.htm. Copyright 2000.*

Claimset.com @ http://web.archive.org/web/20011217201034/www.claimsnet.com/public/. Copyright 2000.*

Llana, Jr. A. "Conveying the Image", Feb. 1992, v12, n8, p22 (4). Gale Group Computer DB, [online] DG Review. Retrieved from: Dialog Accession No. 01513428.

"Octel unveils strategic roadmap for health care marketplace focus is on efficiency-enhancing applications global messaging" Mar. 1996, Gale Group, Retrieved from: Dialog Access. No. 01354156.

Tanner, Lisa, Claimsnet Files IPO to Fund Internet Service (The Company plans to cash in on growing market for physician's claims processing), Dallas Business Journal, May 8, 1998, vol. 21, Issue 37, p. 10 1/2p.

Article entitled "Healtheon: Zigging and zagging to adjust to health care realities", published in Health Management Technology, vol. 18, Issue 18, p30, Jul. 1997.

"7 Easy Steps to Processing Claims Over the Internet," www.claimsnet.com. Oct. 27, 2005. <http://web.archieve.org/web/19970411062301/http://www.claimsnet.com>.

"eStellarNet Releases StellarVue®, the First Internet Document Management System for the Property & Casualty Insurance Industry." *PR Newswire.* New York: Nov. 28, 2000, p. 1. <http://proquest.umi.com/pdqweb?did=64750641&sid=3&Fmt=3&clintld=19649&RQT=309&VName=PQD>.

Jonson, Tom. "A New Way to Expedite Claims Delivery." Risk Management; May 1992; 39,5; ABI/INFORM global; p. 70-71.

Overman, William and William McCormick, "Setting Up a Law Practice" *Practical Lawyer.* 42:5 (Jul. 1996): 1-7.

Sweeney, Sean P., "Murphy's Law in Different Cases, Lawyer's Fee Structures Vary." *Patriot Ledger.* Quincy, MA. (Jun. 27, 1998): 1-2.

"Health Care Claim Payment/Advice, Supplemental Implementation Guide", updated Sep. 8, 2004, © 2004 Blue Cross and Blue Shield of South Carolina, ® Registered marks of the Blue Cross and Blue Shield Association, pp. 1-10.

* cited by examiner

Health Care Claims Form

| Plan I D | |
|---|---|
| Insured's I D | |
| Paitent's date of birth | - mm/dd/yy |
| Provider I D | |

FIG. 3

Health Care Claims Form

Plan ID : 1234

Insured : Doe, John 541XXXXX

Patient : 01, Jane

Provider: MISCELLANEOUS PROVIDERS

| Please enter the Patient Dependent Number from above from above: | | | | |
|---|---|---|---|---|
| Last Name, First, Middle Initial, I.D. | | | | |
| Referring Physician | | | | |
| Service Provider | | | | |
| Diagnosis or Nature of Illness or Injury. | | | | |

| Dates of Service | | Place | Type | Procedure, Service or Supplies | | | |
|---|---|---|---|---|---|---|---|
| From | To | Svc | Svc | CPT | Modifier | Diagnosis No | $Charges |
| | | | | | | | |
| | | | | | | | |
| | | | | | | | |
| | | | | | | | |
| | | | | | | | |
| | | | | | | | |

| Patient's Account | Accept Assign? | Total Charge | |
|---|---|---|---|
| | Yes ○  No ○ | Amount Paid | |
| | | Balance Due | |

PROCESSING AN INSURANCE CLAIM USING ELECTRONIC VERSIONS OF SUPPORTING DOCUMENTS

RELATED PATENT APPLICATIONS

Reference is made to U.S. patent application Ser. No. 10/044,341, entitled "Delivering Electronic Versions of Supporting Documents Associated with an Insurance Claim," filed on the same date as the present application and U.S. patent application Ser. No. 10/044,384, entitled "Facilitating Paperless Processing of Insurance Claims," filed on the same date as the present application, both of which are incorporated herein by reference.

BACKGROUND OF THE INVENTION

1. The Field of the Invention

The present invention relates to systems and methods for facilitating the processing of health care insurance claims. More particularly, the present invention relates to systems and methods for promptly delivering supporting documents to an insurance carrier or payer to facilitate processing of a health care insurance claim for rendered services by the institutional health care provider.

2. The Relevant Technology

Over the years, the delivery of health care services has shifted from individual physicians to large managed health maintenance organizations. This shift reflects the growing number of medical, dental, and pharmaceutical specialists in a complex variety of health care options and programs. This complexity and specialization have created large administrative systems that coordinate the delivery of health care between health care providers, administrators, patients, payers, and carriers.

Although beneficial in some respects, the use of large administrative systems has increased the complexity of claim processing through requiring numerous supporting documents to accompany a health care insurance claim. These supporting documents, such as laboratory reports X-rays, physician notes, patient charts, discharge papers, etc, are typically needed before processing of the health care insurance claim can occur. The need for such supporting documents increases health care cost while, at the same time, makes it difficult for health care providers to receive payment for services rendered, whether the carrier or payer advances such payment to the provider before processing of the claim or subsequent to the adjudication of the claim.

The need for supporting documents accentuates the detrimental effect that large administrative systems have had on the payment of claims for health care services. In addition to receiving and reviewing tens of thousands of payment requests each day and tens of millions of requests a year, a single health management organization has to verify the receipt of appropriate supporting documents for each health care insurance claim. The sheer volume of payment requests and supporting documents creates a backlog of unpaid claims.

In many situations, the time delay caused by the backlog is increased through incorrectly delivering hardcopies of the supporting documents to the carrier or payer. Consequently the health care provider often receives a request for the supporting documents, a few days or weeks after filing the insurance claim. To enable the carrier or payer to process the insurance claim, an employee of the health care provider must collect the needed documents, obtain hardcopies of the documents, and mail the copies to the carrier. Due to the slow communication between the health care provider and carrier, it is not uncommon for a time delay of weeks or months between performance of health care and processing and/or adjudicating the claim.

Additionally, time delays occur due to the complexity and fluidity of the contractual obligations between parties, i.e., the health care provider, patient, carrier or payer. Often, there are many different contractual arrangements between patients, payers or carriers, and health care providers. The amount that is authorized for payment may vary by the service or procedure, by the particular contractual arrangement with each health care provider, by the contractual arrangements between the carrier or payer and the patient regarding the allocation of payment for treatment, and by what is considered consistent with current medical practice. As these contractual relationships change, it is often necessary for carriers or payers to spend additional time reviewing and analyzing claims, further delaying the payment for services rendered by the health care provider. This is particularly true when claims are submitted with clerical errors, in which case the claim will be disputed and may ultimately have to be resubmitted. This is also the case when the health care provider forgets to provide the appropriate supporting documents that are typically required by a carrier or providers and allow the carrier or provider to adjudicate an insurance claim.

This delay in time is exacerbated when a claim is disputed. When a claim is disputed, it must be adjudicated to determine exactly which services are authorized and how much a health care provider will be paid. Adjudicating a claim can take several weeks or months and may require multiple submissions of the same claim, with or without associated supporting documents. While a claim is being adjudicated, a health care provider is left without funds for services that have already been rendered, and as a result, the health care provider may suffer serious financial problems that are associated with cash flow realities.

During recent years, there has been an attempt to expedite the payment of health care services by automating the process for creating, reviewing, and adjudicating payment requests. For example, there currently exist claims processing systems whereby technicians at a health care provider's office electronically create and submit medical insurance claims to a central processing system. The technicians input information identifying the physician, patient, medical service, carrier or payer, and other data with the medical insurance claim. The central processing system verifies that the physician, patient, and carrier are participants in the claims processing systems. If so, the central processing system converts the medical insurance claim into the appropriate format of the specified carrier or payer, and the claim is then forwarded to the carrier or payer. Upon adjudication and approval of the insurance claims, the carrier or payer generates a check, which is delivered to the provider. In effect, such systems bypass the use of the mail for delivery of insurance claims and save overall time. Unfortunately, such systems do not eliminate the need to deliver needed supporting documents through the mail, thereby limiting the efficiency of the automated claim adjudication system.

Further, even using these automated systems, medical technicians at the health care provider's office are often unable to determine whether the claim, as it is submitted, is in condition for payment. In the event that the claim is not in condition for payment, the claim will undergo a protracted adjudication, which may include multiple resubmissions of the same claim, with or without associated supporting documents. For example, it has been found that a large number of insurance claims are submitted with information that is incomplete, incorrect, or that describes diagnoses and treatments that are not eligible for payment. Accordingly, these claims may be rejected for any of a large number of informalities, including clerical errors, patient ineligibility, indicia of fraud, etc. The health care provider, however, is not made aware of the deficiencies of the submitted claims until a later date, potentially weeks afterwards, when the disposition of the insurance claim is communicated to the health care provider. As a result, many claims are subject to multiple submission and adjudication cycles, as they are successively created, rejected, and amended. Each cycle may take several weeks or more. The resulting duplication of effort decreases the efficiency of the health care system and increases the time it takes to process a claim.

Studies have shown that some insurance claim submission systems reject up to 70% of claims on their first submission for including inaccurate or incorrect information or for other reasons. Many of the claims are eventually paid after they have been revised in response to an initial rejection. Thus, while systems that permit electronic submission of insurance claims marginally decrease the time needed to receive payment by eliminating one or more days otherwise required to deliver claims by mail, they remain subject to many of the problems associated with conventional claims submission systems. For instance, existing systems are incapable of providing an effective manner of delivering copies of supporting documents to the carrier or payer to enable adjudication of the claim.

In many situations, health care providers cannot afford the luxury of waiting an extended time for claims to be processed because of financial obligations related to operating expenses and overhead. This is particularly true for solo physician providers, small groups of physicians acting or working together, and those physician providers that purchase new equipment and hire experienced staff. Any delay in receiving payment can create cash flow problems. Accordingly, in order to attempt to minimize the number of claims that are rejected and effectively reduce the overall amount of time it will take to get paid, physicians or their staff have had to spend inordinate amounts of time investigating which treatments will be covered by various insurance carriers and insurance plans. Normally, such activity involves calling insurance carriers over the telephone. The time spent in such activities, however, increases overhead costs and represents further efficiency losses in the health care system. One consequence of the inefficient and lengthy claims processing system is that some physician providers are deterred from purchasing new equipment and hiring experienced, high-salary, staff because of cash flow constraints.

In view of the foregoing, there is a need in the art for providing these physician providers with a manner to deliver supporting documents with an insurance claim that enables a carrier to provide an advance payment for services rendered by the physician provider. For example, it would be an advancement in the art to provide a claims payment system that would enable solo physicians, small groups of physicians, or the like, to deliver a claim request with associated supporting documents in a quick and efficient manner that enables the physician provider to receive payment for services rendered prior to the completion of a conventional claims adjudication process, particularly when the adjudication process is protracted due to claim informalities and administrative inefficiencies. It would also be an advancement in the art to provide a claims payment system that would identify the supporting documents to be delivered to the carrier or payer based upon the contractual relationship between the physician provider, the carrier or payer, and the patient. Further, it would also be an advancement in the art to provide a claims payment system that would enable physician providers to know exactly how much co-payment to request from a patient before discharging the patient.

BRIEF SUMMARY OF THE INVENTION

The present invention relates to methods and systems for requesting and delivering supporting documents to an insurance carrier to enable the carrier to process an insurance claim for services rendered by a health care provider, such as a solo physician, a small group of physicians working together, or the like. According to the present invention, a medical technician can retrieve and/or organize supporting documents for an insurance claim for services rendered by a physician provider. The particular supporting documents needed for a particular insurance claim can be identified by a local client system used by the medical technician. Alternatively, the needed supporting documents can be defined by a remote server system that communicates with the local client system.

The medical technician prepares the supporting documents, and using a digital device, generates an electronic version of the supporting documents. These electronic versions are deliverable to a remote server system that prepares digital or electronic images of the supporting documents. Subsequently, the remote server system, or an associated web server, hosts the images according a patient specific number or identifier and enables access to the same through security mechanisms.

In addition to hosting the images, the remote server system delivers a notice to the carrier or payer informing of the availability of the supporting documents in an electronic form. This notice can include appropriate security credentials that will allow the carrier or payer access to the hosted images. Alternatively, the notice can include the images themselves.

The present invention reduces the time needed to provide supporting documents for an insurance claim. Specifically, by providing electronic images of those supporting documents needed for a specific insurance claim, the methods and systems of the present invention eliminate the need for communication between the carrier and the physician provider through regular mail. Consequently, the amount of time taken to process an insurance claim and distribute payment for the insurance claim is significantly reduced compared to current systems.

Additionally, embodiments of the present invention can reduce the amount of time it takes for a physician provider to receive payment for services rendered. The invention can also reduce the time, effort, and expense that have been associated with the submission of claims that are not in condition to be paid, such as claims that are submitted with clerical errors. Further, embodiments of the present invention enable a medical technician to receive an almost immediate indication of any co-payment that is required of a patient. This further enhances the likelihood and ability of a physician provider to receive advance payment for services rendered.

According to one illustrative configuration, a medical technician prepares an insurance claim electronically, including supporting documents, submits the claim via a wide area network such as the Internet, or another wide area or local area network, and receives almost immediately an indication whether the patient is covered by insurance and whether the submitted claim is in condition for advance payment. In the event that the claim is not in condition for advance payment, the physician provider is notified of the claim rejection and can properly amend the claim by correcting the errors. Once it is determined that the claim is in condition for advance payment, the claim is submitted to the patient's carrier or payer for conventional claims processing and, if necessary, adjudication. Optionally, the claim is simultaneously submitted to a payment entity where it is determined what funds should be advanced to the physician provider and how the finds are to be distributed.

Further, to expedite the payment of claims to physician providers, the present invention provides methods and systems for generating electronic or digital images of supporting documents for the insurance claim and providing the carrier access to such supporting documents. To achieve this, a medical technician generates electronic versions of the supporting documents using a digital device, such as but not limited to, a digital scanner, a facsimile machine, or the like. These electronic versions are delivered to the remote server system that converts the electronic versions of the supporting documents into digital or electronic images.

Subsequently, the remote server system indexes the digital or electronic images based upon the administrative data, such as the patient specific identifier, and hosts the images, either directly or through the use of a associated web server. Access for the carrier is provided through security mechanisms, such as security credentials, or the like.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention relates to methods and systems for facilitating the delivery of supporting documents from a physician provider to a carrier or payer to enable the carrier or payer to promptly process the claim and pay the physician provider for the services rendered. Further, embodiments of the present invention relate to systems and methods for promptly paying physician providers for services rendered, even before payment requests for the rendered services and associated supporting documents can be processed and/or adjudicated by the carrier or payer. Additionally, embodiments of the present invention relate to identifying supporting documents to be delivered with an insurance claim and, optionally, notifying a physician provider of which supporting documents to include with the insurance claim.

The system for providing supporting documents associated with an insurance claim can be implemented in a system for electronically submitting insurance claims to a server system. The supporting documents are transmitted in an electronic format at or near the time of submission of the associated insurance claim to enable the claim to be efficiently adjudicated. In this manner, the physician provider submits all documents needed to process the insurance claim and avoids the need to send the supporting documents by mail or to respond to delayed requests for supporting documents that, in conventional systems, are commonly received weeks after initial submission of insurance claims.

Embodiments of the invention include or are incorporated in computer-readable media having computer-executable instructions or data structures stored thereon. Examples of computer-readable media include RAM, ROM, EEPROM, CD-ROM or other optical disk storage, magnetic disk storage or other magnetic storage devices, or any other medium capable of storing instructions or data structures and capable of being accessed by a general purpose or special purpose computer. Computer-readable media also encompasses combinations of the foregoing structures. Computer-executable instructions comprise, for example, instructions and data that cause a general purpose computer, special purpose computer, or special purpose processing device to execute a certain function or group of functions. The computer-executable instructions and associated data structures represent an example of program code means for executing the steps of the invention disclosed herein.

The invention further extends to computer systems for interactively preparing insurance claims, generating electronic versions of supporting documents for the insurance claims, determining whether the claims are in condition to be paid, and paying insurance claims. Those skilled in the art will understand that embodiments of the invention may be practiced in computing environments with many types of computer system configurations, including personal digital assistants, personal computers, multi-processor systems, network PCs, minicomputers, mainframe computers, and the like. The invention will be described herein in reference to a distributed computing environment, such as the Internet, where tasks are performed by remote processing devices that are linked through a communications network. In the distributed computing environment, computer-executable instructions and program modules for performing the features of the invention may be located in both local and remote memory storage devices.

1. Network Environment

Figure 1:
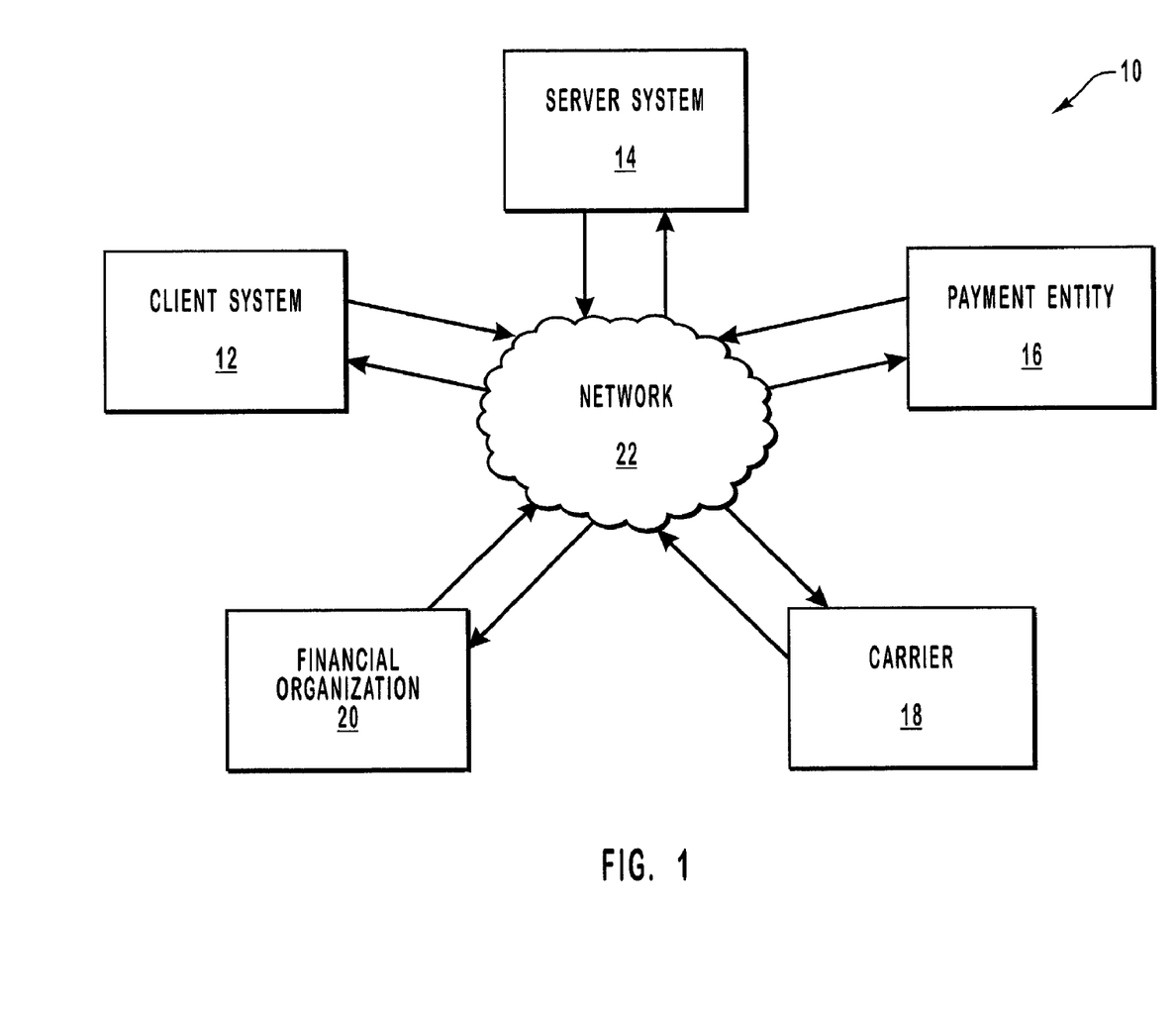
FIG. 1 illustrates a schematic representation of one embodiment of the system of the present invention.

FIG. 1 illustrates one embodiment of a system and method for preparing and delivering supporting documents for an insurance claim, resulting in the prompt payment of health insurance claims. Discussions herein will be directed to implementation of the present invention from the standpoint of client systems and remote server systems that facilitate the performance of the functions and features described herein. It is understood that reference to "a client system" generally refers to the physician provider, while reference to "a remote server system" or "remote server computer" generally refers to a claim facilitator. The client system may be located at the offices of a physician provider in order to allow a medical technician to create and submit insurance claims. As used herein, the term "physician provider" is to be broadly construed to include solo physicians, groups of physicians within a clinic, or the like. As used herein, the term "medical technician" represents any person who engages in the activity of preparing or submitting insurance claims on behalf of a physician provider. Since medical technicians are typically employees of physician providers or representatives of physician providers any of the claims that recite acts, operations, or processes conducted by "physician providers" are to be construed to extend to the same acts, operations, or processes conducted by "medical technicians", as well.

The term "claim facilitator" generally references organizations, entities, hardware, and/or software that assist with processing of insurance claims, requesting supporting documents, generating electronic images of supporting documents, and acting as an intermediary between one or more of the physician providers, the carrier, the payment entity, and the financial institution, as described hereinafter.

The terms "carrier" and "payer" are generally interchangeable, and any reference to "carrier" in the specification or claims extends to entities that can be classified as "payers" unless otherwise specified.

The term "insurance plan" extends to any contractual or other legal arrangement whereby medical and other related expenses are paid by a carrier on behalf of a patient beneficiary. Examples of insurance plans include health maintenance organizations, fee-for-service health care plans, employer-sponsored insurance plans, etc.

As illustrated, system 10 can include a client system 12 configured to communicate with a server system 14 via a network 22. The client system 12 can be a general-purpose computer, such as a personal computer, or a special purpose computer adapted to perform the functions and operations disclosed herein. A medical technician can use client system 12 to retrieve and deliver data to and from server system 12. Further, client system 12 can communicate with one or more of a payment entity 16, a carrier 18, and/or a financial organization 20 via network 22, such as a local area network, a wide area network, the Internet, or the like. The various functions and structures associated with each of the above will be described in greater detail hereinafter.

Figure 2:
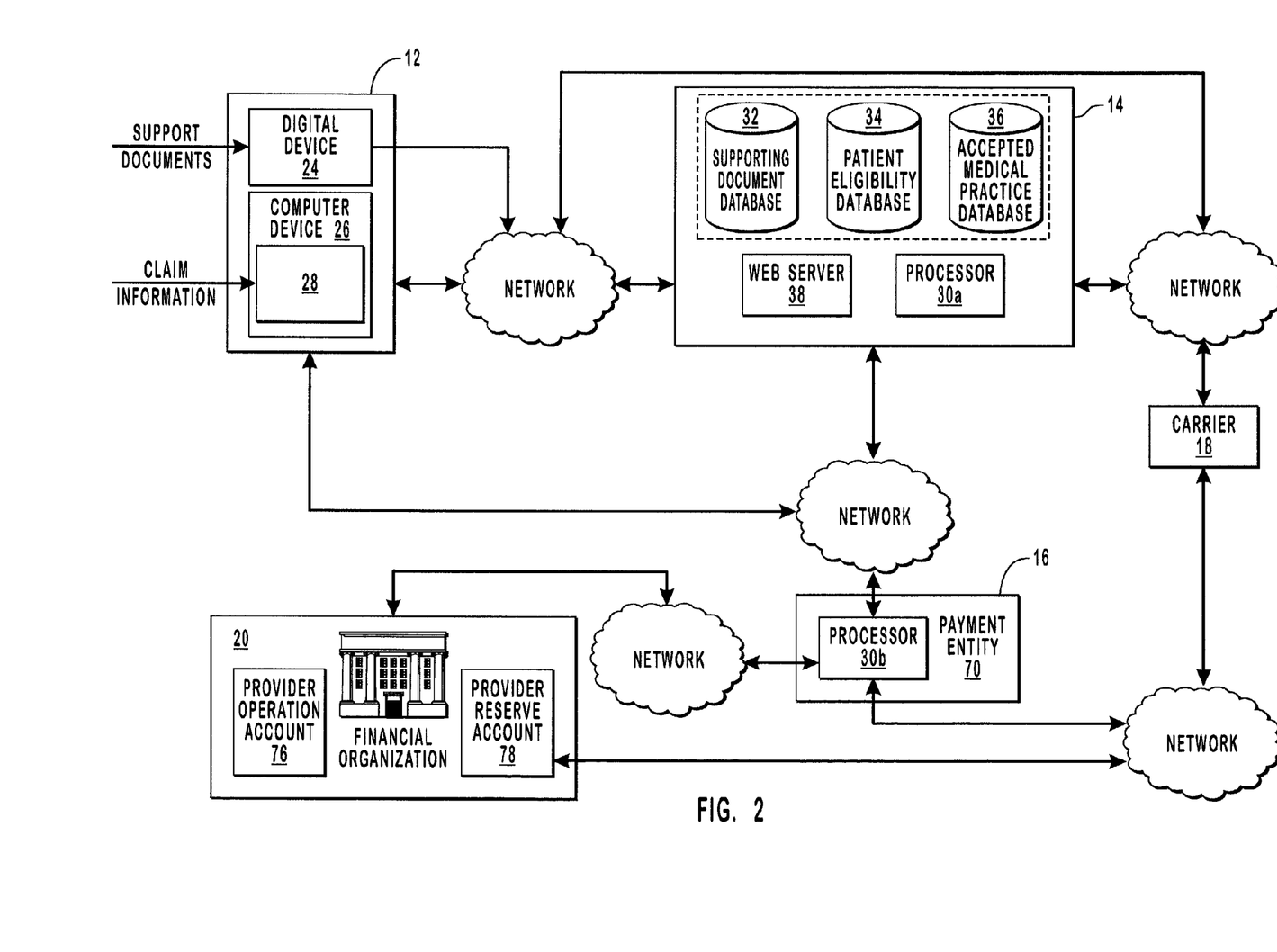
FIG. 2 is schematic diagram illustrating an interactive system according to the invention, including a client system located at the offices of a physician provider, a remote server system, a carrier or payer, a payment entity, and a financial institution that includes a reserve account and an operational account.

Referring now to FIG. 2, client system 12 may include a display device such as a monitor for displaying claim form 28, as will be disclosed in greater detail below, and one or more input devices such as a keyboard, a mouse touch sensitive screen or pad, etc. for enabling a medical technician to enter the required information to client system 12. Further included at a client side of system 10, is a digital device 24 that is configured to scan the supporting documents associated with the claim generated with claim form 28, as will be discussed hereinafter. Digital device 24 can take various forms, such as a facsimile machine, a scanner, or the like. Although reference is made to digital device 24 as being part of client system 12, one skilled in the art can appreciate that digital device 24 can be separate from client system 12, while being in communication with client system 12 and one or more of the other systems or modules of system 10, such as through network 22 or one or more other networks.

The embodiment illustrated in FIG. 2 also includes a server system 14 located typically at a remote location with respect to client system 12. Server system 14 can include one or more general purpose computers or special purpose computers adapted to execute functions and operations of the invention. For example, in FIG. 2, server system 14 includes a processor 30a, which represents a general purpose computer for receiving information associated with insurance claims and for determining whether the received insurance claim is in allowable condition for advance payment. The operation of server system 14 and processor 30a will be discussed in greater detail below.

In one embodiment, processor 30a is capable of accessing information stored in a supporting document database 32, a patient eligibility database 34 and an accepted medical practice database 36. Database 32 can include a compilation of data indicative of the supporting documents associated with the insurance claims generated by client system 12. Similarly, database 34 can include compilation of data that enables server system 14 to determine whether a particular patient identified at client system 12 is a beneficiary of an approved insurance health plan. Likewise, database 36 can be any compilation of data that enables service system 14 to determine whether the health care services associated with a submitted claim are approved for advance payment. Generally, a submitted claim is approved for advance payment if it is determined that the patient is a beneficiary of an approved insurance carrier/plan and the services rendered are qualified services under the particular insurance plan of the patient. Alternatively, a submitted claim is approved for advance payment if it is determined that the needed supporting documents have been retrieved from client system 12 and are stored within supporting document database 32, that the patient is a beneficiary of an approved insurance carrier/plan, and the services rendered are qualified services under the particular insurance plan of the patient.

In addition to the above, server system 14 is shown including a web server 38. The web server 38 provides client system 12, carrier 18, payment entity 16, and financial organization 20 access to the information and data stored or generated by server system 14. Further, a patient or other individual interested in such information associated with the system of the present invention uses web server 38, through appropriate user interfaces and security credentials, to access the same. For instance, the physician provider can access its bank accounts to reconcile fees charged and monies received for services rendered. This account information may reviewed based upon specific days, weeks, months, years, payee, insurance carrier, or any other suitable parameter. Further, the physician provider can access its line of credit, transfer funds between different accounts, identify monies outstanding with different insurance carriers or payers, or the like. Similarly, the patient can access information specific to treatment received by the patient to see if the insurance carrier paid the fees and identify whether there are any outstanding balances for which the patient is responsible.

While the illustrated components of server system 14 of FIG. 2 can be located at a single remote site with respect to client system 12, other embodiments of the invention employ a processor 30*a*, databases 32, 34, and 36, and web server 38 that may be located at different sites with respect to each other. The terms "server system" and "remote server" also extend to the latter case, wherein the various components 30*a*, 32, 34, 36, and 38 are located in a distributed environment unless specifically indicated otherwise.

In the embodiment of FIG. 2, client system 12 and server system 14 communicate by a network infrastructure 22. While the invention is described herein in the context of the Internet, those skilled in the art will appreciate that other communications systems can be used, such as direct dial communication over public or private telephone lines, a dedicated wide area network, wireless communication, or the like.

2. Claim Preparation and Adjudication

The following discussion relates to processes of creating and adjudicating insurance claims using the above-described system. Although the following techniques can facilitate the insurance claim creation and adjudication process, the methods of paying insurance claims according to the invention, including advancing funds to the physician provider using a short-term loan, can be practiced in connection with insurance claims prepared and adjudicated in other ways, such as other electronic or paper insurance claims. Further details relating to the following insurance creation and adjudication processes are disclosed in U.S. patent application Ser. No. 09/118,668, filed Jul. 17, 1998, entitled "Internet Claims Processing System," and U.S. patent application Ser. No. 09/204,886, filed Dec. 3, 1998, entitled "Provider Claim Editing and Settlement System," which are incorporated herein by reference.

Referring to FIG. 2, when a medical technician of the physician provider desires to prepare an insurance claim for health care services, the medical technician operates client system 12 and establishes communication with server system 14 or verifies that communication has been established. For instance, the medical technician may use client system 12 at the physician provider to dial into a modem pool associated with an Internet service provider in network infrastructure 22. After communication with the Internet service provider has been achieved, client system 12 may be used to transmit a Uniform Resource Locator (URL) to infrastructure 22 that requests access to resources provided by server system 14. Alternatively, any other suitable technique can be used to establish communication between client system 12 and server system 14.

In many cases, client system 12 can maintain communication with server system 14 for an extended period of time during which claims for multiple patients are processed. For instance, client system 12 can be a dedicated terminal at the physician provider that maintains communication with server system 14 in order for numerous insurance claims to be created and processed.

Once communication has been established, the medical technician at the physician provider can use client system 12 to request claim form 28 to be displayed on a monitor associated with client system 12. Claim form 28, in one embodiment, is a Hyper Text Markup Language (HTML) document retrieved from server system 14 and displayed to the medical technician. Alternatively, claim form 28 can have any other suitable format or can be stored at a local cache or any other local data storage system, whether temporary or permanent, at client system 12, thereby eliminating the need to repeatedly retrieve claim form 28 from a remote location as multiple insurance claims are created.

Figure 3:
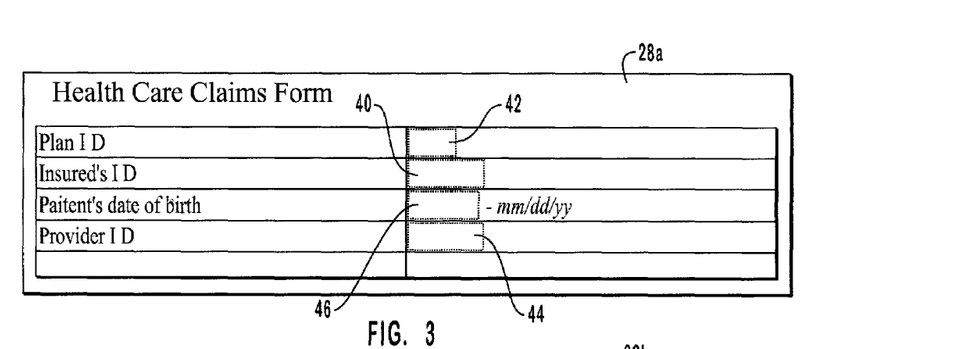
FIG. 3 illustrates an insurance claim form that enables a medical technician to determine whether and to what extent a patient is a beneficiary of an approved insurance plan.

FIG. 3 illustrates one example of a claim form 28*a* that enables a medical technician to verify that a patient is a beneficiary of an insurance plan and to learn of the details of the insurance plan. In this embodiment, claim form 28*a* includes a field 40 to which a patient specific identifier can be entered by a medical technician of the health care provider. Depending on the manner in which the invention is implemented, the medical technician may be required to enter other information, such as insurance information, other patient specific information, such as name, age, date of birth, social security number, or the like, physician provider identification information, treatment information, or the like.

Returning to FIG. 3, claim form 28*a* includes a field 42 for identifying the insurance plan of the patient, a field 44 for receiving information identifying the physician provider and a field 46 for entering additional information identifying the patient. As shown in FIG. 3, field 46 can be adapted to receive a patient's date of birth. Alternatively, any other information that can uniquely identify a particular patient from among a pool of patients can be used in combination with fields 40 and 46. By way of example and not limitation, the patient identification information entered to fields 40 or 46 can be modified to include patient's social security number, or any other number uniquely associated with the patient by a carrier or a health maintenance organization.

Referring now to FIG. 2, after the medical technician has entered a patient specific identifier, insurance information, and, optionally, other information about the patient and/or the insurance carrier, the medical technician uses client system 12 to transmit the information to server system 14. In one embodiment, processor 30*a* compares the insurance information, optionally in combination with information about the patient, against data stored in patient eligibility database 34 to determine if the patient is a beneficiary of an insurance health plan and, if so, the details of the benefits thereof. In the event that the patient is found not to be a beneficiary of an approved insurance health plan, information is transmitted from server system 14 to client system 12 to inform the medical technician of this result. Thus, when the patient is not a beneficiary, a medical technician and the physician provider can promptly learn of this status and take appropriate steps to modify the claim to correct errors, if any, that prevented the patient from being recognized as a beneficiary of an approved health insurance plan.

In the event that it is determined that the patient is a beneficiary, information is likewise transmitted from server system 14 to client system 12 informing the medical technician and hence the physician provider of the patient's status. This information can also provide details of the coverage provided to the patient that can allow the physician provider to know how much of a co-pay to request from the patient before the patient is discharged from the facility. Information can also contain details regarding the types of diagnoses and treatments that are approved for payment, as well as corresponding diagnosis and treatment codes, so that the medical technician does not have to spend time researching to know what codes correspond to the services performed.

Figure 4:
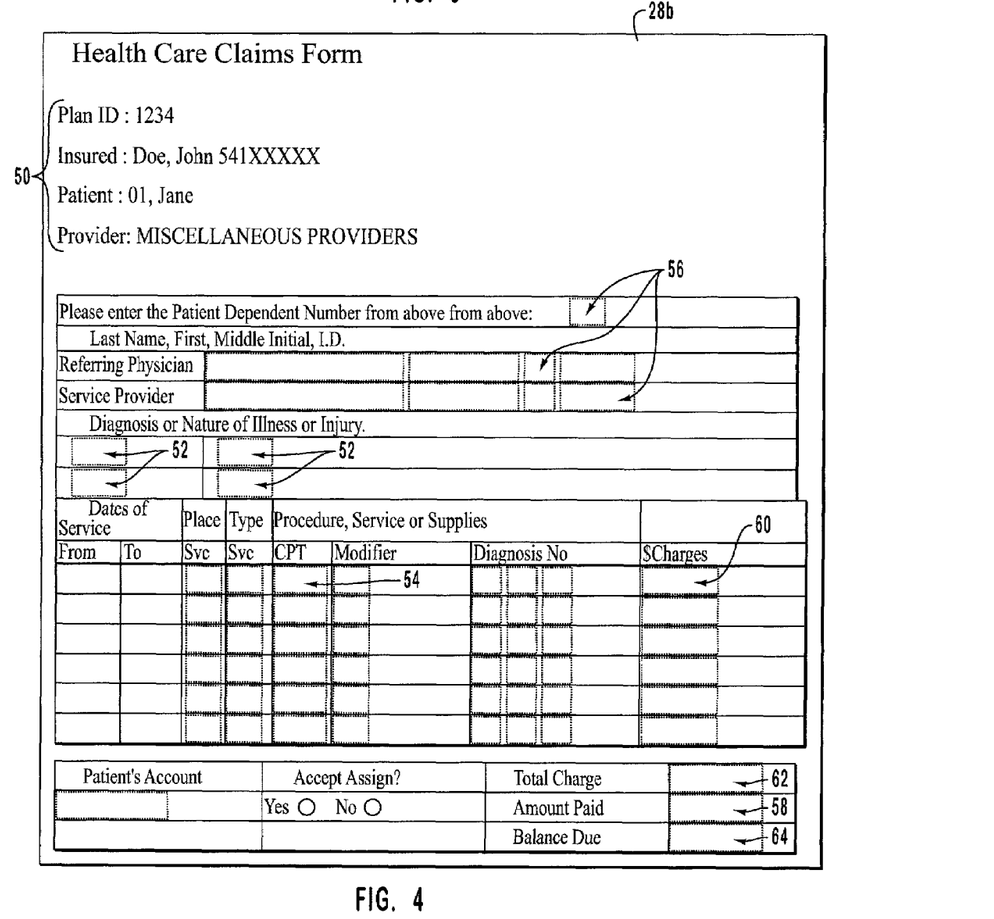
FIG. 4 illustrates an insurance claim form that enables a medical technician to submit an insurance claim including one or more diagnosis codes and one or more treatment codes.

The medical technician can complete the claim form by entering treatment information, including but not limited to, at least one diagnosis code and one treatment code, into fields specifically adapted to accept the diagnosis code and the treatment code, as illustrated in FIG. 4. Claim form 28*b* of FIG. 4 and claim form 28*a* may be separate forms displayed to the medical technician using client system 12 or can be separate portions of a single claim form. Claim form 28b, in the example of FIG. 4, includes header information 50 that has been automatically prepared by the server system before claim form 28b was transmitted to client system 12. Providing a claim form 28b that is automatically partially completed contributes to the efficiency of the claims creation and submission processes of the invention. While claim form 28b represents a claim form that can be advantageously used by many physician providers, the specific fields included in the form and the information displayed on the form may vary from one implementation to another, depending on the type of health care provider, insurance plan, and other factors.

Claim form 28b includes a plurality of fields 52 designed to receive and display diagnosis codes representing the diagnosis of the patient or the nature of the patient's illness or injury by a physician at the health care facility. Thus, as used herein, "diagnosis code" refers to any information that specifies or indicates a patient's condition as diagnosed by a physician at a physician provider. Any predefined set of diagnosis codes can be used with the invention.

Claim form 28b also includes one or more fields 54 designed to receive and display treatment codes associated with the diagnosis code of field 52. As used herein, "treatment codes" can represent any type of health care services, including, but not limited to clinical therapy, pharmacological therapy, therapeutic supplies or devices, and other goods or services that can be paid for by health insurance plans or health maintenance organizations. The treatment codes can be selected from any desired set of predefined treatment codes that define various treatments that can be administered to patients. In one embodiment, the diagnosis codes and the treatment codes can be selected from the codes and code modifiers of a volume entitled Physician's Current Procedural Terminology (CPT), which is maintained and updated annually by the American Medical Association.

As shown in FIG. 4, claim form 28a can also include other fields, such as fields 56, which are to be completed by the medical technician before the insurance claim is submitted. In this example, fields 56 are adapted to receive and display information identifying the patient, a referring physician, and the physician provider who is to receive payment for the rendered health care services.

Referring again to FIG. 2, when fields 52, 54, and 56 are filled out, the medical technician submits the information included in these fields to server system 14 from client system 12. The server system 14 receives this information and performs a claim verification process, in response thereto, to determine whether the claim, as submitted, is in condition for advance payment for services rendered. Typically, a determination that the claim is in condition for advance payment is made if the claimed services correspond to health care services that are approved for payment by the patient's insurance plan. For instance, processor 30a can compare the diagnosis code and treatment code with a compilation of currently accepted medical procedures stored in database 36. In one embodiment, a database of prevailing health care charges, such as the Medical Data Research (MDR) database, or a customized database compiled by an entity operating the payment system of the invention is used to determine whether the diagnosis codes and treatment codes correspond to health care services that are approved for payment. Upon learning of the invention disclosed herein, those skilled in the art will understand how an MDR database or another database can be used to determine whether the submitted claim form represents health care services that are approved for payment.

Database 36 can alternatively be one that is compiled or supplemented on an ongoing or repeated basis as the entity that authorizes the insurance claims for advance payment processes large numbers of insurance claims associated with particular payers or insurance carriers. For example, the processes disclosed in U.S. patent application Ser. No. 09/634,679, filed Aug. 8, 2000, entitled "Determining the Degree of Acceptance of Proposed Medical Treatment," which is incorporated herein by reference, can be adapted for this purpose.

Server system 14 also determines whether the information provided in claim form 28b is sufficiently complete to place insurance claim in condition to be paid. For example, if the medical technician inadvertently fails to include information that identifies the referring physician, server system can detect this error and notify client system 12 of the deficiency so that it can be remedied.

The claim verification process that is performed by server system 14 can be as complex as desired. In one embodiment, server system 14 analyzes the information submitted using claim form 28b to determine whether there are indicia of fraud or mistake, whether unusually expensive health care services are listed in the claim, or whether other anomalies are present that suggest the claim is not suitable for advance payment according to the present invention.

One technique that is sometimes used by physician providers to collect more money from insurance plans than is otherwise warranted is the practice of unbundling medical procedures. "Unbundling" consists of performing, for example, multiple medical procedures on a patient through a single surgical incision while submitting an insurance claim for the multiple medical procedures as if they had been performed separately. Typically, when only one incision is required to perform multiple medical procedures, the payment to the operating physician is less than the payment would be if each of the multiple medical procedures had been conducted through separate incisions. Other fraudulent unbundling techniques for submitting claims on multiple medical procedures are sometimes used as well. Thus, server system 14 can analyze the diagnosis codes and the treatment codes for indicia of unbundling practices. Furthermore, server system 14 may conduct any other checks on the submitted claim. For example, the server system 14 may cross reference the patient gender with the diagnosis and treatment codes. In would be inappropriate, for example, for a hysterectomy to be performed on a male or a vasectomy to be performed on a female.

When the claim exhibits any of the foregoing features, the claim may be denied eligibility for advance payment of funds for services rendered. In which case, the physician provider will have to wait until the claim is processed and adjudicated by a corresponding carrier. Alternatively, the claim may be returned to the physician provider to allow revision of the claim. For example, server system 14 can transmit reply information to client system 12 informing the medical technician of a negative result and can indicate the basis for rejecting a claim. Thus the medical technician can be informed that the claim form was not completely filled out, the treatment code is inconsistent with the diagnosis code, or any of a number of other possible reasons for rejecting the insurance claim. In response, the medical technician can amend the insurance claim by entering the correct information to the fields of claim form 28b of FIG. 4, if necessary. In other cases, the physician provider can be informed of what diagnosis and treatment codes are appropriate for the services that were performed and will be approved for advance payment, according to the patient's insurance plan.

In the event that the medical technician wishes to amend the insurance claim, the new information is transmitted from client system 12 to server system 14 for processing. Server system 14 then repeats the previously described claim verification process of determining whether the amended insurance claim is in allowable condition for advance payment. The above-described procedure can be repeated as many times as desired or necessary to create and submit an insurance claim that describes health care services that are approved for payment by the patient's insurance plan, and subsequently eligible for advance payment prior to the carrier actually processing the claim. It should be appreciated that even if it is ultimately decide that a submitted claim is not eligible for advance payment, the claim verification process of the present invention, which can take just minutes even when resubmissions are required, significantly reduces the time it takes for a claim to be processed and, if necessary, adjudicated by a carrier. This is particularly true when the claim verification process identifies clerical errors that can be identified and corrected almost instantaneously. It should be appreciated that this is an improvement over the prior art for at least informing a physician provider of correctable claim errors early on so that a physician provider does not have to engage in research, telephone conversations or hold time, and mail adjudications just to place a claim in allowable condition to be paid.

When server system 14 notifies the medical technician that the claim describes health care services that are approved for payment by the patient's insurance plan, and subsequently eligible for advance payment prior to the carrier actually processing the claim, server system 14 requests the medical technician to send the appropriate supporting documents for the prepared claim through digital device 24. Upon receiving the electronic versions of the supporting documents, server system 14 generates electronic images of the supporting documents, and through web server 38 posts them on a secure web site that is accessible to carrier 18, as will be described in detail hereinafter.

The list of what supporting documents to send to server system 14 can be automatically generated by server system 14 and delivered to the medical technician through client system 12. Alternatively, client system 12 can prompt the medical technician to deliver supporting documents to server system 14 upon receiving notification from server system 14 that the claim describes health care services that are approved for payment by the patient's insurance plan, and subsequently eligible for advance payment prior to the carrier actually processing the claim.

In another configuration, client system 12 can include a list of supporting documents to be delivered to server system 14 based upon any combination of the information included in claim form 28. For instance, as the medical technician fills out claim form 28, or upon submitting claim form 28 to server system 16, client system 12 identifies pertinent information, such as the insurance carrier information, the diagnosis information, the treatment information, etc. Using this information, client system 12 can access a supporting document database to identify the particular supporting documents needed based upon information included in claim form 28.

In another configuration, server system 14 can prompt the medical technician for relevant supporting documents; resulting in the medical technician reviewing one or more hard copy documents indicating the particular combination of supporting documents to include with the claim for the particular insurance carrier.

Even though the processing and adjudication of insurance claims may be expedited in some degree by the foregoing description of the present invention, including delivering or providing access to electronic images of supporting documents for insurance claims, some physician providers find that processing of insurance claims by corresponding carriers still takes too long for their needs. This is true even when the claims are submitted in allowable condition for payment and are paid as expeditiously as possible through the carrier administrative systems. To remedy this problem, the present invention provides methods and systems of promptly paying physician providers for services rendered, even before the appropriate carrier can process the corresponding insurance claims. In particular, the present invention provides a payment entity 16, as shown in FIG. 2, which advances a credit of funds to the physician provider for rendered services, before the claim and associated supporting documents, when needed, are reviewed and adjudicated by the carrier.

3. Payment of Insurance Claims by Advancing Funds

Returning to FIG. 2, once server system 14 determines that a claim is eligible for advance payment, server system 14 transmits claim data to a payment entity 16, which is in communication with server system 14 through infrastructure 22. It should be appreciated that payment entity 16 includes at least one server computer to perform the functions described herein by using appropriate computer-readable media and computer-executable instructions. In one embodiment, payment entity 16 uses a processor 30b to pre-adjudicate the submitted claim. In an alternative embodiment, payment entity 16 uses processor 30a of server system 14 to pre-adjudicate the submitted claim. Pre-adjudication involves determining how much money will be advanced for the claimed services. This determination is made by comparing any combination of patient information, insurance information, treatment information, and other information with archived records of insurance payment histories, similar claim payment results, adjudication rules, and the like. Pre-adjudication also may involve determining how the funds, if approved, are to be distributed and into which accounts they are to be distributed.

In one embodiment, payment entity 70 acts as a clearinghouse for the claim forms received by server system 14. Consequently, payment entity 70 communicates the resulting data of the pre-adjudication to server system 14. The resulting data includes financial information that server system 14 subsequently transmits to client system 12 to inform the physician provider that the submitted claim is in condition for advance payment and the amount that will be advanced for services rendered. As a matter of example, claim form 28b of FIG. 4 may include in an amount paid field 58 a dollar amount that is to be promptly paid for services rendered. The advance may be equal to the amount that was previously determined as being likely to be paid by the carrier on behalf of the patient. Receiving this information permits the medical technician to know exactly how much money to request from the patient for services rendered, in the form of a co-payment.

To illustrate, the medical technician might enter in field 54 a treatment code that represents a physical exam performed by a physician. The medical technician could then enter in field 60 a dollar amount, such as $100, that represents the physician's charges for performing the physical exam. Field 62 sums all dollar amounts entered in fields 60. In this example, if the physical exam was the only treatment rendered to the patient, field 62 would also display a dollar amount of $100. If, however, payment entity 16, when pre-adjudicating the submitted claim, determines that the patient's carrier typically pays only $90 for a physical exam, field 50 displays the dollar amount of $90 that is eligible for advanced payment according to the invention. A balance due field 64 displays the difference between total charge field 62 and amount paid field 58. Accordingly, the dollar amount displayed in field 64 represents the amount that should be collected from the patient for services rendered. As used herein, the term "co-payment" is defined to extend to the dollar amount displayed in field 64, representing the amount that is to be collected from the patient beyond the payment that is approved for payment by the carrier.

In another embodiment, amount paid field 58 does not represent the amount that will be advanced in the form of an advance payment, but rather, it represents the coverage amount of the patient's insurance plan. According to this embodiment, the physician provider and/or the patient can access EOP data, if desired, on the Internet infrastructure by accessing an EOP website that is updated by the payment entity and/or by corresponding financial entities. For example, following generating an EOP, the carrier can use a digital device to create image of the EOP. Once the image is created, the carrier can deliver the image to server system 14 that hosts the image and provides access thereto for the physician provider and/or patient.

Although the previous example goes into some detail regarding how payment entity 16 and server system 14 are in communication, suggesting they are discrete entities, it should be appreciated that payment entity 16 and server system 14 can comprise a single organization or single server system.

Using the present invention, medical technicians and physician providers can be informed of the status of submitted insurance claims in a relatively short amount of time that is significantly less than conventional systems, which may require days, weeks, or more. Indeed, for practical purposes, the medical technician receives a response to the submitted insurance claim almost immediately. It can be understood that the limiting factors with respect to the speed of response include the data transmission rate supported by infrastructure 22 of FIG. 2 and the other communication links between the various components of the system, the processing capabilities of processor 30*a* and other components of server system 14, and the complexity of the submitted claim and the nature of the claim processing techniques performed by server system 14. Accordingly, although it was previously mentioned that paper claims could be submitted and subsequently converted to electronic form, payment generally occurs earlier when communication between client system 12, server system 14, and payment entity 16 occurs via an electronic medium, such as infrastructure 22.

When an electronic medium is used, the response time is short enough that a medical technician can conveniently continue viewing the claim form associated with a particular patient at client system 12 while server system 14 performs the operations that determine whether the submitted claim is in condition to be paid and while payment entity 16 pre-adjudicates the claim to determine what funds if any will be made available for advance payment. Thus, a medical technician can efficiently and consecutively create and submit a series of claims and receive verification that the claims are in allowable condition for advance payment. In other words, a medical technician can easily create, submit, and, if necessary, revise and resubmit, a single claim before proceeding to the next claim in a series of claims, since the response time can be very short. This is in sharp contrast to prior art systems in which the response time of days, weeks, or longer make it entirely impractical for medical technicians to complete the entire claim creation and processing for one claim before proceeding to the next claim.

FIG. 2 also shows that server system 14 is in communication with carrier 18, which represents any health insurance company, health maintenance organization, fee-for-service health care company, employer-sponsored health insurance, etc. The carrier includes appropriate computer-readable media and computer-executable instructions to perform the functions described herein. In one embodiment, server system 14 transmits claim information to carrier 18 simultaneously with the transmission of the claim information to payment entity 16. In the event that carrier 18 is not able to receive electronic claim data transmitted over infrastructure 22, then server system 14 produces paper claim documents that are mailed to carrier 18 via conventional paper mail systems. The carrier 18 processes the insurance claim, which may include adjudication. However, because most of the claims that are transmitted from server system 14 are prescreened by the claim verification process, it is unlikely that a claim will require extensive adjudication. It should be appreciated that this improves the overall efficiency of carrier 18 claim processing and adjudicating processes.

In addition to receiving claim form 28, carrier 18 is provided with access to electronic images of the supporting documents needed by the carrier. The carrier 18 can receive electronic copies of the images of the supporting documents or alternatively receive a notification of the availability of electronic images of any required supporting documents. In either case, access to the electronic images is controlled by security credentials and/or mechanisms to safeguard the confidential nature of medical documents. These credentials may be specific for a particular insurance carrier, physician provider, and/or patient.

As stated earlier, when a carrier requests the inclusion of supporting documents with a claim, the medical technician delivers the supporting documents to server system 14 through digital device 24. The digital device 24 generates an electronic version of the hard copy documents, and delivers the electronic versions to server system 14. Server system 14 receives these electronic versions and converts them into digital images storable in support document database 32 and/or hosted by web server 38. The digital images are indexed based upon the relevant patient and carrier information included in claim form 28, such as but not limited to, indexed according to the patient specific identifier.

These images are accessible at a website hosted by server system 14, such as the web site hosted by web server 38, upon carrier 18 providing the appropriate security credentials, such as usernames and passwords specific to the insurance carrier or payer and optionally specific to the physician provider. Further, an encrypted communication link can optionally be formed between carrier 18 and server system 14 to facilitate secure delivery of sensitive patient and medical information to carrier 18. In this manner, carrier 18 receives supporting documents in a short period, thereby allowing carrier 18 to process, and if needed, adjudicate the claim quickly and efficiently. Further, carrier 18 can store electronic copies of the supporting documents rather than storing paper copies of the supporting documents. Therefore, the complexity of accessing claims and supporting documents later is reduced.

Additionally, for those carriers that need paper copies of the supporting documents, whether it is based upon state and/or federal rules or regulations or carrier specific operating requirements, carrier 18 can print copies of the electronic versions of the supporting documents. Consequently, embodiments of the present invention facilitate the delivery of supporting documents to a carrier, while avoiding the time delay for mailing the supporting documents to a carrier.

Through providing the claim and any supporting documents electronically to carrier 18, a carrier can process, and if needed, adjudicate a claim and deliver payment of the claim within a shorter period than is currently possible. Despite this improvement to the time within which a physician provider is paid for servers rendered, some physician providers would prefer to have more immediate payment for rendered health care services. To meet this demand, embodiments of the present invention provide for advance payment to the physician provider. For instance, in one embodiment, payment entity 16 transmits a fund distribution request to financial entity 20, such as a bank, requesting that advanced funds be credited into an account that are immediately accessible to the physician provider for rendered health care services. The financial entity 20 may include computer systems and servers to perform the functions described herein by using appropriate computer-readable media and computer-executable instructions.

According to one embodiment, the fund distribution request provides information for financial entity 20 to know exactly how much money to advance and how to distribute the funds. The fund distribution request may, for example, request that the funds be distributed between a provider operational account 76 that is accessible to the physician provider and a provider reserve account 78 that is not accessible to the physician provider. The funds distributed to the provider operational account 76 are immediately accessible to the physician provider, whereas the funds in the provider reserve account are not accessible to the physician provider, but instead are debited for service fees, interest on any unpaid balances, and to pay off any unpaid balances.

The following is one example of how a fund distribution request may occur and how it enables a physician provider to receive advance payment for rendered health care services. As a matter of illustration only, a physician provider submits a claim for $100. After being subjected to the claim verification process by server system 14 and the pre-adjudication process by payment entity 16, it is determined that the $100 claim is eligible for an advance payment of only $90. Within minutes or hours, payment entity 16 submits a fund distribution request to financial entity 20 for payment of $90 to be paid distributed between two accounts, $72 (80% of $90) into provider operational account 76 and $18 (20% of $90) into provider reserve account 78. Accordingly, the health care provider is then given immediate access to $72 for rendered services, even though the payment request submitted to the carrier may not be paid for weeks or months.

Although reference is made to dividing the advanced monies by percentages of 80/20, it can be appreciated by one skilled in the art, that various other percentage divisions are possible. Illustratively, the operations account can be credited with between 0% and 100% of the advance money, while the reserve account can be credited with between 0% and 100% of the advance money. In general, therefore, the operations account can be credited with any percentage of the available advance money, while the reserve account receives the remainder of the advance money.

Once carrier 18 completes the processing of a claim, including optionally reviewing hard copy and/or electronic copies or images of supporting documents, and submits payment for the claim, the funds are credited to provider reserve account 78 to pay for previously identified expenses. This transfer of funds can occur either electronically or manually. Any funds remaining in reserve account 78 after expenses are paid are transferred to provider operational account 76 and are accessible by the physician provider. EOP data regarding fund distribution requests and actual account transactions is updated and available through infrastructure 22. EOP data provides physician providers with immediate access to information regarding what funds are available and what credits and debits have been made to the reserve account. This information can be updated by financial entity 20 and/or by payment entity 16. Once carrier 18 processes the claim, carrier 18 submits explanation of benefits (EOB) data to the patient, which can be received by mail or accessed electronically through infrastructure 22.

For example, following generating an EOB, the carrier can use a digital device to create an image of the EOB. Once the image is created, the carrier can deliver the image to server system 14 to initiate hosting of the EOB through web server 38, where the physician provider and/or patient can access the EOB. Additionally, following the electronic transfer of funds to provider reserve account 78 to pay for previously identified expenses, documentation indicative of such an electronic transfer can be scanned to create an image of the documentation. For instance, the documentation can be a check or some other documentation indicating that monies were transferred to the physician provider's reserve account. Once the image is created, this image is delivered to server system 14 and accessible to the physician provider and/or patient using typical browser applications.

Figure 5:
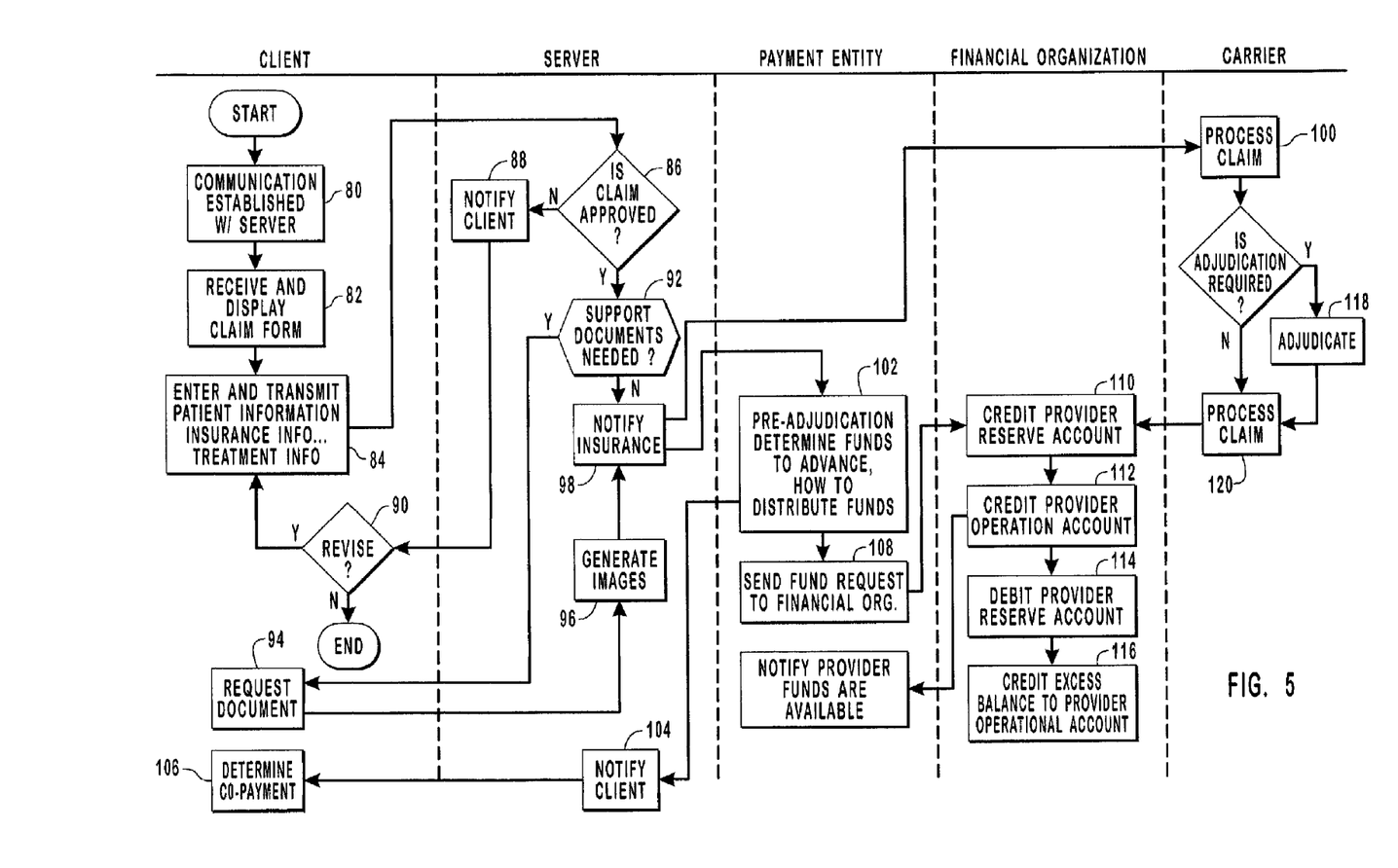
FIG. 5 is a flow diagram illustrating one embodiment of the methods of the invention for delivering supporting documents to a carrier and paying a claim after determining that the claim is in allowable condition for advance payment.

FIG. 5 illustrates a flow diagram of one embodiment of the present invention. As shown, in step 80, communication is established between the client system and the server system as described herein. In step 82, the client system receives and displays the claim form to enable the medical technician at the physician provider to enter the information to complete the insurance claim. As previously noted, the client system can retrieve the claim form from the remote server system or from a local data storage device. In step 84, the medical technician enters the patient information, insurance information, and treatment information to the server system.

In step 86, the server system determines whether the patient is a beneficiary of an approved insurance plan. The server system, in step 86, may also subject the claim to a claim verification process to verify that the claim does not contain irregularities and to verify that the claim is eligible for advance payment. In the event that it is determined that the claim, as submitted, is not in condition for advance payment or if the patient is not a beneficiary of an approved insurance plan then the client system is notified, as represented by step 88. The claim can then be revised, as represented by step 90, and resubmitted until the claim is placed in condition for advance payment, if possible.

In step 92, after determining that the claim is approved for advance payment, the server system determines whether supporting documents for the claim are to be delivered to the carrier. When supporting documents are needed, the server system notifies the client and prompts the medical technician at the physician provider to deliver the supporting documents to the server system via the digital device, as shown in step 94. The server system subsequently generates digital images of the supporting documents, as shown in step 96.

Thereafter, in step 98, the server system notifies the appropriate carrier of the insurance claim and provides the carrier with information that allows the carrier to access the images of the supporting documents to process the claim, as shown in step 100. For instance, the server system can send copies of the digital images, correspondence indicating a particular URL where the digital images may be retrieved, access credentials specific to the carrier, the physician provider, the patient, and/or the claim, or the like.

Although reference is made to the server system determining that supporting documents are to be sent to the carrier for the prepared insurance claim, one skilled in the art can appreciate that the client system can notify the medical technician to deliver the supporting documents to the server system.

As shown in step 102, the payment entity determines how much money to advance to the physician provider for services rendered and how the funds are to be distributed. The server is notified of the resulting decision, as shown in step 104, which is subsequently passed on to the client system. At that point, in step 106, the client system determines what co-payment, if any, is required from the patient.

The payment entity submits a fund distribution request to the financial entity, step 108, instructing the financial entity to advance a credit of funds between a provider reserve account, step 110, and a provider operational account, step 112. The provider reserve account is credited, step 110, with designated advance funds and with any payments that are made from carriers for processed claims. The funds in the reserve account are not immediately accessible to the physician provider, but instead are debited, step 114, to pay for any service fees, interest, and to pay down any unpaid balance. Any remaining balance in the provider reserve account is credited to the provider operational account, step 116. The funds in the provider operational account are immediately available to the physician provider.

Either preceding, concurrent with, or subsequent to the above, the carrier begins processing the claim, optionally with a review of the associated supporting documents, as shown in step 100. In the event that adjudication is necessary then the carrier adjudicates the claim, as shown in step 118. Finally, after processing the claim, step 120, and, if necessary, after adjudicating the claim, step 102, the carrier provides payment for the rendered health care services by making payment to the providers reserve account, step 110, which is debited, step 114, for services and advanced funds that were previously provided to the physician provider.

It can be understood that the above described method is illustrative of only one method for performing the desired function. Various other methods are appropriate for advancing monies to the physician provider. For instance, the carrier can credit the provider's operational account rather than the reserve account.

The systems and methods disclosed herein can be practiced in combination with the systems disclosed in U.S. patent application Ser. No. 09/204,886, entitled "Provider Claim Editing and Settlement System", filed Jul. 17, 1998, which is incorporated herein by reference. For example, the claim preparation and editing systems of the foregoing patent application can be employed to determine whether health services are approved for payment prior to performing health care services. Furthermore, the methods of the present invention can be adapted according to the methods disclosed in the foregoing patent application to determine whether health services are eligible for advance payment prior to performing such services.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a server system that communicates with a client system associated with a health care provider and is adapted to facilitate processing of an insurance claim, a method of delivering a supporting document to a carrier to enable the carrier to process an insurance claim and for advancing payment to the physician, the method comprising the acts of:

the server system determining that an insurance claim for services rendered by the health care provider is in condition for advance payment prior to adjudication by a carrier;

the server system transmitting claim information associated with the insurance claim to a payment entity, such that the payment entity can advance money to the health care provider prior to the carrier making payment on the insurance claim;

the server system generating a list of supporting documents needed to process the insurance claim based on information included in the insurance claim, the list of supporting documents identified from a supporting document database having data indicative of supporting documents needed to process the insurance claim;

the server system providing the list of supporting documents to the client system;

the server system, upon receiving the supporting documents identified in the list of supporting documents and associated with the insurance claim in an electronic format from the client system, storing an electronic image of the supporting documents;

the server system causing the payment entity to advance payment to the health care provider prior to adjudication of the insurance claim by the carrier, wherein a portion of the advance payment is reserved for at least one of service fees, unpaid balances, or interest on unpaid balances in an account that is not accessible to the health care provider; and the server system transmitting the insurance claim and a notice of the availability of the electronic image to the carrier, such that the carrier can access the image, process the insurance claim, and make payment on the insurance claim to the payment entity, thereby paying for the advance payment previously made to the health care provider.

2. A method as recited in claim 1, wherein the act of determining that the insurance claim is in condition for advance payment comprises the act of determining whether a patient identified by the insurance claim is a beneficiary of the carrier.

3. A method as recited in claim 2, wherein the act of determining that the insurance claim is in condition for advance payment further comprises the act of determining whether treatment information identified by the insurance claim corresponds to health care services that are approved by the carrier.

4. A method as recited in claim 1, further comprising, if it is determined that the insurance claim is not in condition for payment, performing the acts of:

prior to transmitting the insurance claim to the carrier, notifying the client system that the insurance claim is not in condition for payment; and receiving an amended insurance claim from the client system in which one or more errors in the insurance claim have been corrected, such that the amended insurance claim is in condition for payment.

5. A method as recited in claim 4, further comprising the act of transmitting a suggested revised treatment code that corresponds to the health care services rendered to the client system.

\* \* \* \* \*